United States Patent [19]
Manire

[11] Patent Number: 5,794,967
[45] Date of Patent: Aug. 18, 1998

[54] PASSENGER AIR BAG MODULE WITH MEANS FOR RETAINING AN AIR BAG DEPLOYMENT DOOR TO A HOUSING

[75] Inventor: Gregory B. Manire, Oxford, Mich.

[73] Assignee: AlliedSignal Inc., Morristown, N.J.

[21] Appl. No.: 691,761

[22] Filed: Aug. 2, 1996

[51] Int. Cl.⁶ .................................................. B60R 21/20
[52] U.S. Cl. ............................... 280/728.3; 280/732
[58] Field of Search ........................... 280/728.3, 728.2, 280/732, 731, 730.1, 728.1

[56] References Cited

U.S. PATENT DOCUMENTS

| | | | |
|---|---|---|---|
| 5,342,090 | 8/1994 | Sobczak et al. | 280/728.3 |
| 5,454,586 | 10/1995 | Rogerson | 280/728.3 |
| 5,520,411 | 5/1996 | Lang et al. | 280/728.3 |

FOREIGN PATENT DOCUMENTS

| | | | |
|---|---|---|---|
| 2270882 | 3/1994 | United Kingdom | 280/728.2 |

*Primary Examiner*—Peter C. English
*Attorney, Agent, or Firm*—Markell Seitzman

[57] ABSTRACT

An assembly for an air bag (56) adapted to fit within an opening (22) of a vehicle part (20) comprising: a housing (44) having: a first wall (100) and an opposite second wall (102), a flexible third wall (106) secured to the first wall (100) defining a space (150) therebetween, one of the first wall (100) and third wall (106) including a plurality of first tabs (112) extending into the space (150). The housing further including a locking tab (152a,b) to frictionally lock a cover thereto, the second wall (102) including a plurality of locating tabs (120a–c) and latching tabs extending outwardly therefrom. A deployment door or cover is used to enclose the housing. The deployment door includes a hinge portion (40), received in the space, engageable with the first tabs (112) to provide a snap connection therebetween and a seam portion (42) including seam flange (76) engageable with the locating tabs, the seam flange being latched in place by the latching tabs (122a,b) to secure the seam portion (42) to the housing.

11 Claims, 6 Drawing Sheets

5,794,967

1

PASSENGER AIR BAG MODULE WITH MEANS FOR RETAINING AN AIR BAG DEPLOYMENT DOOR TO A HOUSING

BACKGROUND OF THE INVENTION

The present invention generally relates to an air bag safety system and more specifically to a passenger side air bag system including a housing and deployment door (cover) which does not use typical external fasteners.

U.S. Pat. No. 4,893,833 illustrates a passenger side deployment door having a single, flexible hinge along one side and a frangible member along another side of the cover. The frangible member breaks apart in response to air bag deployment forces permitting the cover to rotate about the hinge. The hinge and frangible member are attached to cooperating structure by external fasteners such as bolts, nuts or rivets, received through bolt/rivet holes which make the assembly process more complicated than necessary. In addition, the bolt/rivet holes provide a source of increased stress within the various portions of the door. U.S. Pat. No. 5,348,339 provides a methodology in which the hinge side of the door and housing cooperate to snap together replacing the rivets but the hinge can move vertically.

SUMMARY OF THE INVENTION

It is an object of the present invention to provide an improved methodology for retaining an air bag deployment door to its related housing.

Accordingly the invention comprises: an assembly for an air bag adapted to fit within an opening of a vehicle part, such as an instrument panel. The assembly comprising: a housing having a first outer wall and an opposite second outer wall, and a flexible inner wall secured to the first wall defining a space therebetween. The inner wall includes a plurality of first tabs extending into the space toward the first outer wall and the first outer wall includes a plurality of tabs formed or formable thereon. The second outer wall of the housing includes a plurality of locating tabs and latching tabs extending outwardly therefrom to engage a portion of a deployment door proximate its tear seam. The deployment door includes a hinge portion, received in the space between the first wall and flexible inner wall, engageable with the first tabs to provide a snap connection therebetween and where the door is held in place by a friction coupling provided by the tabs on the first (outer) wall. The deployment door (cover) includes a tear seam portion having a seam flange engageable with the locating tabs. The seam flange being latched in place to the housing by the latching tabs.

Many other objects and purposes of the invention will be clear from the following detailed description of the drawings.

2

Figure 5:
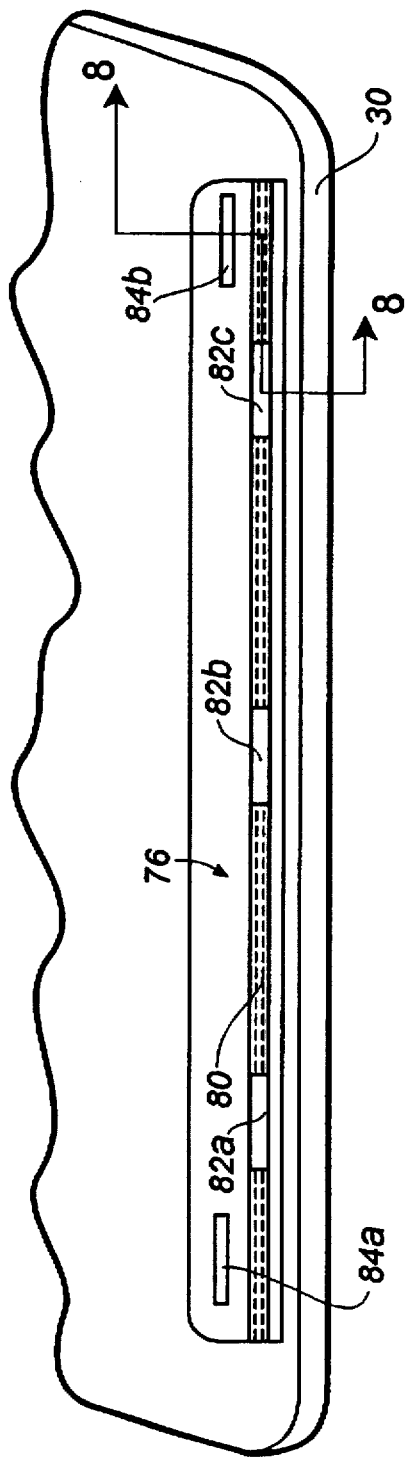

FIG. 5 is a partial isometric view of a cover illustrating a seam flange portion of the door.

Figure 6:
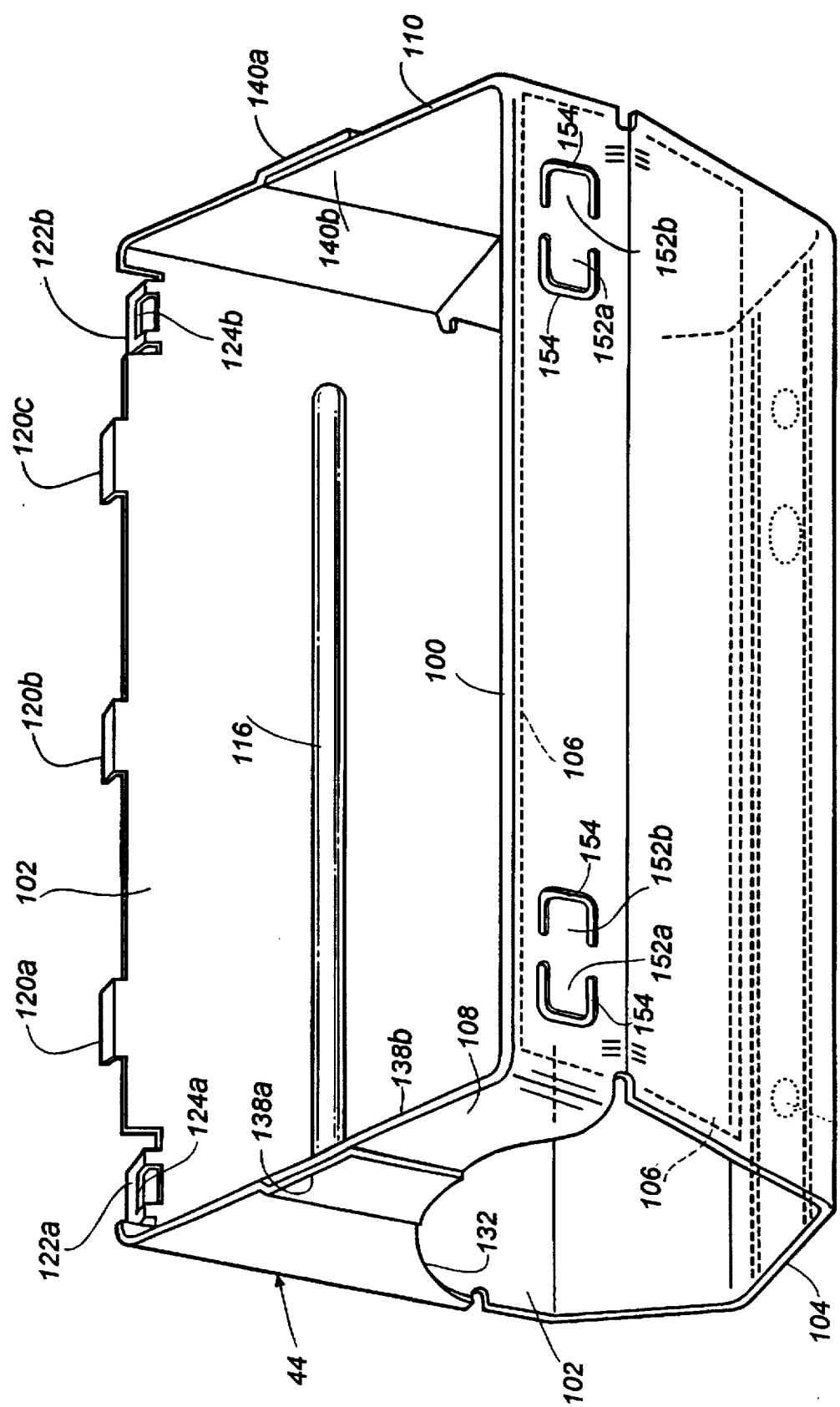

FIG. 6 illustrates an isometric view of the housing.

Figure 7:
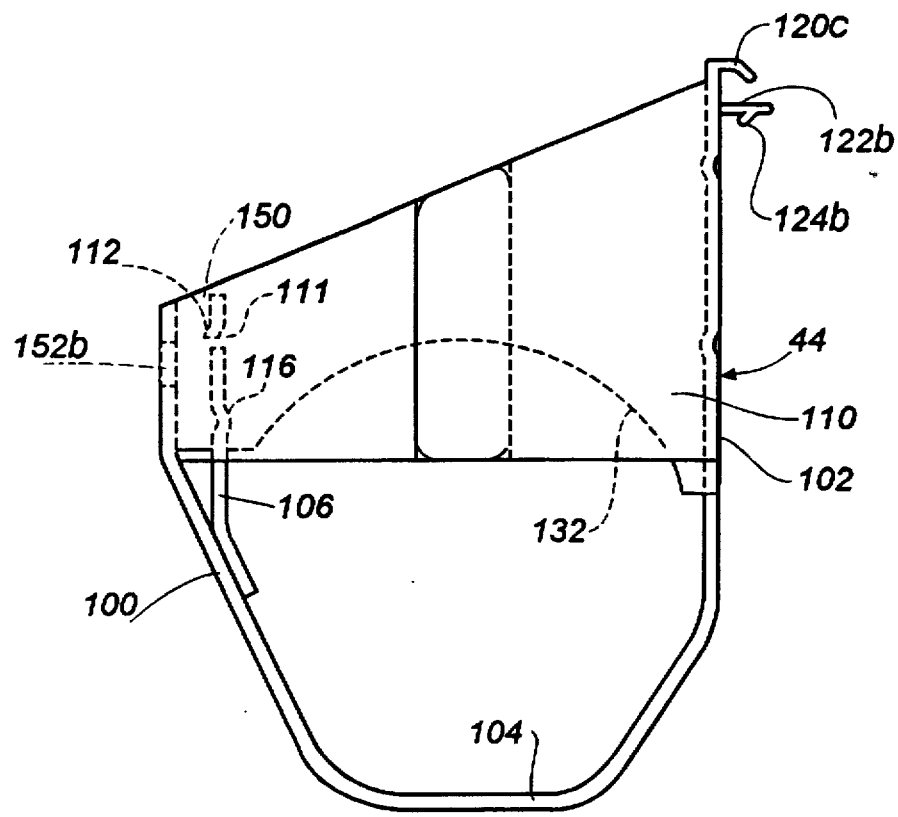

FIG. 7 is an end view of the housing.

Figure 8:
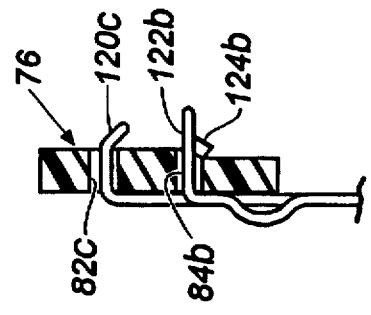

FIG. 8 is an enlarged, partial cross-sectional view taken through section 8—8 of FIG. 5 of a locking tang.

Figure 9:
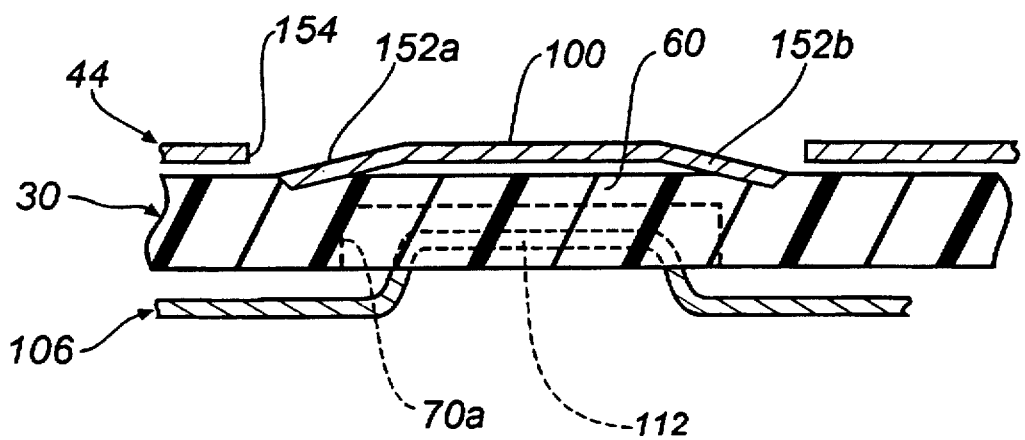

FIG. 9 illustrates a tab in engagement with a cover.

Figure 10:
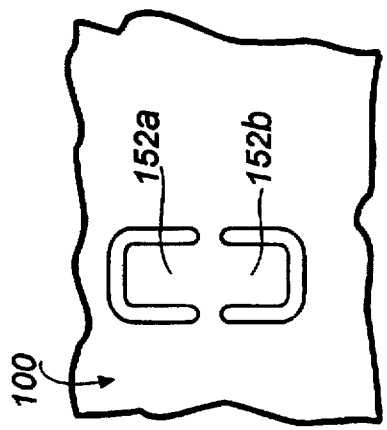

FIG. 10 shows an alternate embodiment of the invention.

Figure 11:
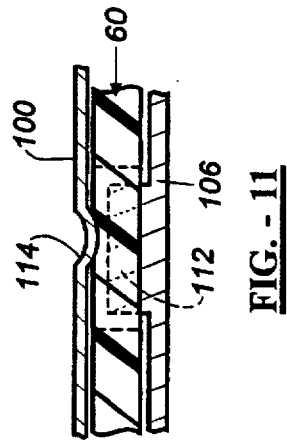

FIG. 11 shows another alternate embodiment of the invention.

DETAILED DESCRIPTION OF THE DRAWINGS

Figure 1:
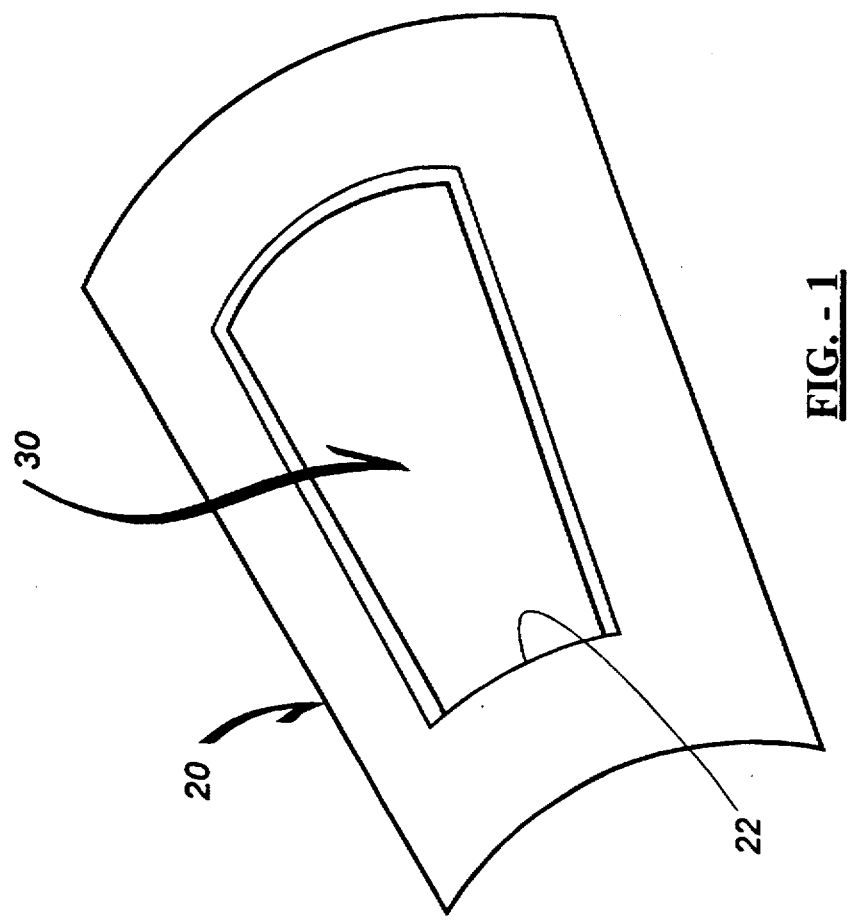
FIG. 1 diagrammatically illustrates the right hand portion of a vehicle instrument panel showing a deployment door fitted therein.
Figure 2:
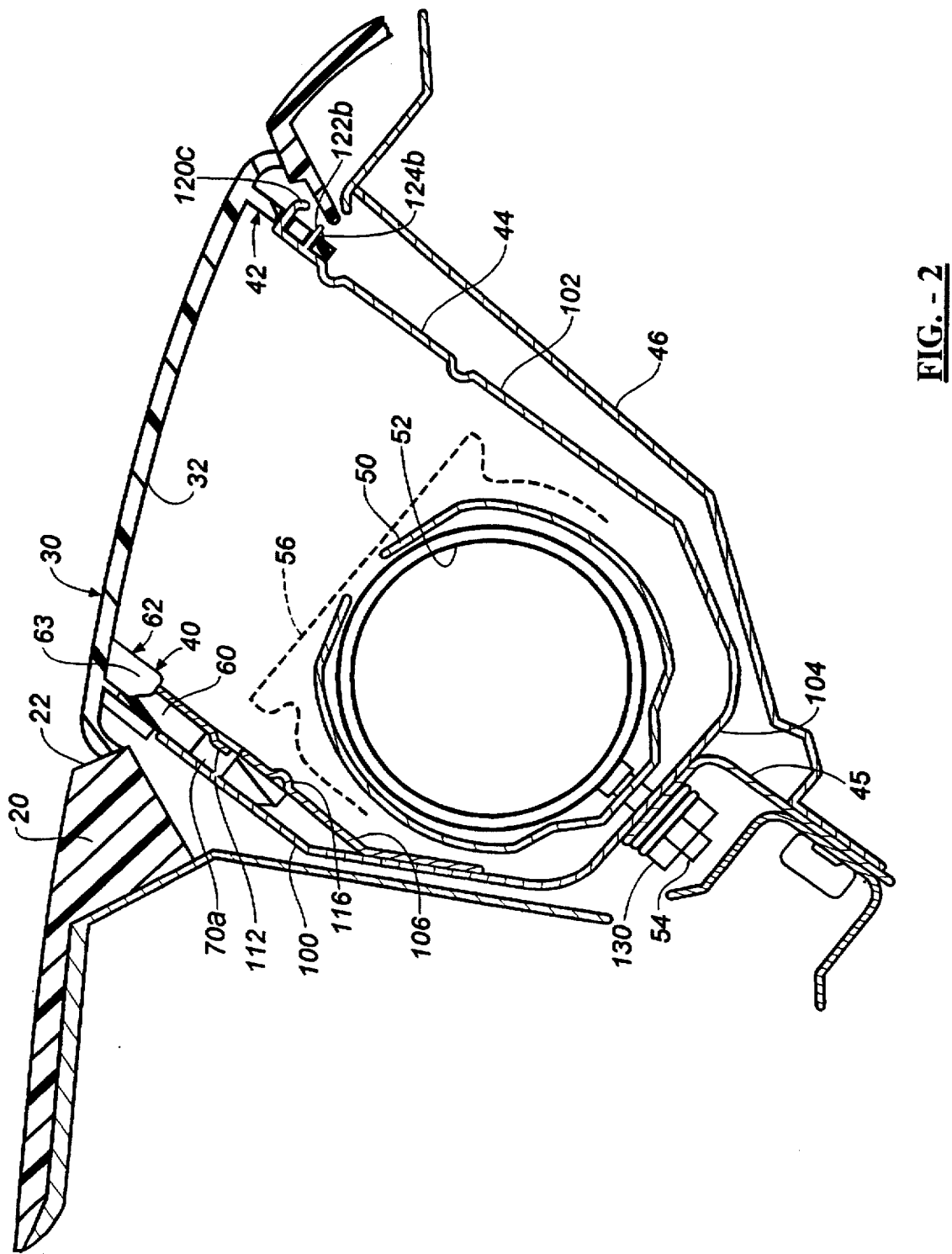
FIG. 2 illustrates a cross-sectional view showing many of the major components of the present invention.

FIG. 1 diagrammatically illustrates the right hand portion of a vehicle instrument panel generally shown as 20 with an air bag deployment door 30 which is fitted within an opening or recess 22 of the instrument panel. FIG. 2 is a cross-sectional view of the instrument panel 20, housing 44 and deployment door or cover 30. The deployment door 30 includes an integrally formed hinge portion 40 extending from the substrate or top portion 32 and a frangible and interlocking seam portion generally shown as 42. The hinge portion 40 and structure surrounding the seam portion 42 are secured (i.e. a snap fit) to the housing 44 without the use of threaded fasteners such as bolts or screws or reaction fasteners such as rivets. The housing 44 may include a mounting flange 45 that is typically fastened to a structural component 46 situated below the instrument panel 20. Positioned within the housing 44 is a manifold 50 which surrounds a gas generator 52 of known variety and fastened by a plurality of bolts 54. An air bag 56 is mounted about the manifold 50. The air bag 56 may be secured in its folded configuration by utilizing a tearable fabric layer (not shown) as is known in the art. The manifold, gas generator and air bag are diagrammatically shown as their construction and method of mounting are of secondary importance and known in the art.

Figure 3:
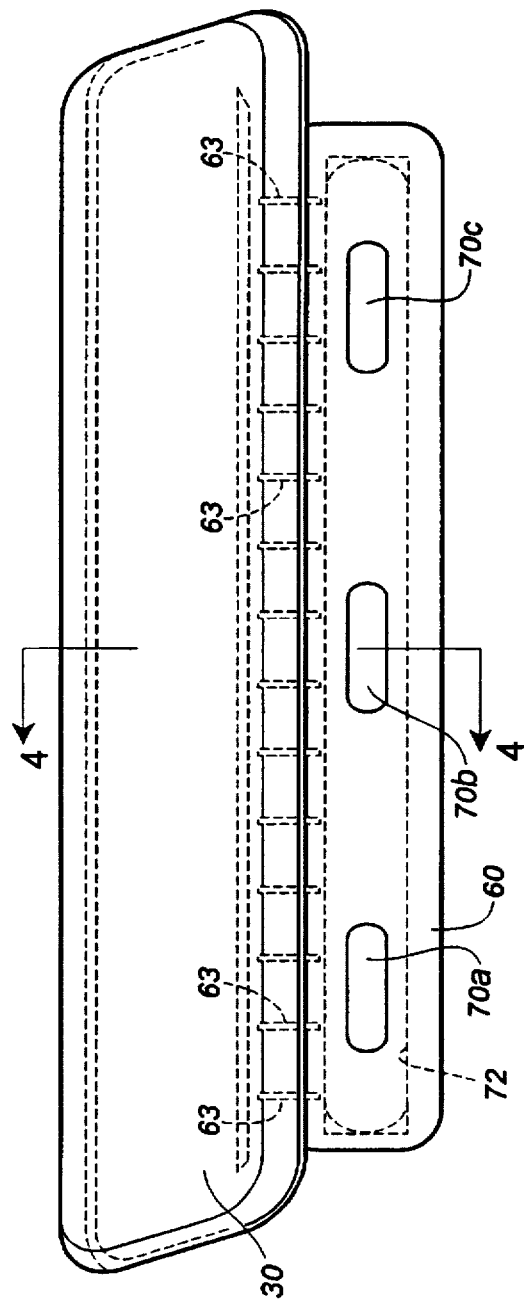
FIG. 3 illustrates a rear plan view of a deployment door showing its integral hinge flange.
Figure 4:
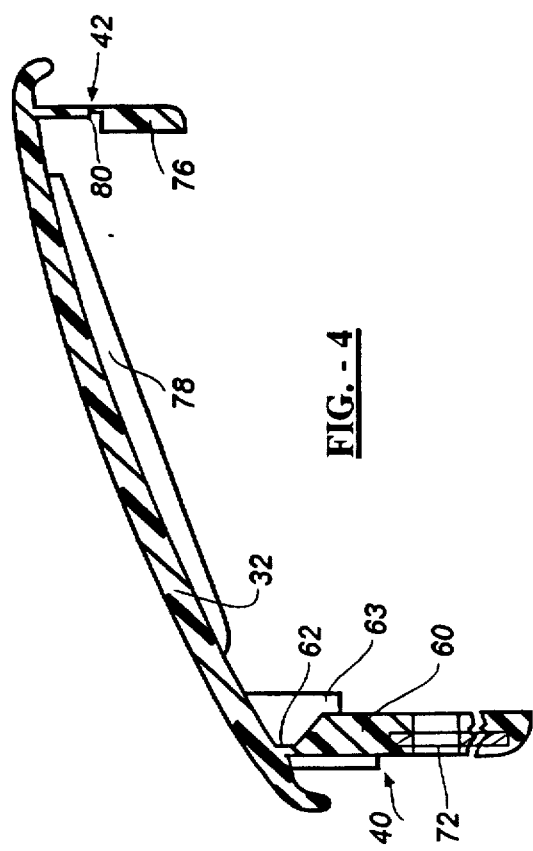
FIG. 4 is a cross-sectional view through section 4—4 of FIG. 3 showing an enlarged view of the deployment door.

The hinge portion 40, shown in greater detail in FIGS. 3 and 4, includes a hinge flange 60 and a hinge 62 formed at the intersection of the hinge flange 60 with the thermoplastic top 32 of the deployment door or cover 30. A reinforcement member 72 (such as a thin metal bar having a plurality of openings therethrough) can be used within the hinge flange to reinforce same. The hinge flange 60 (and the reinforcement member 72 if used) includes a plurality of depressions or openings 70a–c to receive an interfering part of the housing. As can be seen from FIGS. 3 and 4 the hinge 62 comprises a narrowed section of the substrate, to facilitate rotation of the top 32, and further includes additional integrally formed reinforcement bars 63 which run fore and aft (one of which is shown in both FIGS. 2 and 4). Also visible in FIG. 4 is a more detailed view of the frangible seam portion 42 of the door 30. The seam portion 42 comprises a seam flange 76 integrally formed as part of the top 32. As can also be seen from FIG. 4, the cover material, at a lower surface thereof, includes a plurality of molded reinforcement ribs 78 extending from the front to the rear of the top 32. The seam flange 76 includes a tear seam 80 which extends across the length of the seam flange 76. The tear seam comprises a thin portion of the substrate formed in a notch. The notch may be U-shaped or V-shaped to facilitate tearing of the seam flange 76 from the other portions of the door 30. The tear seam 80 can extend continuously across the cover or be segmented.

Reference is made to FIG. 5 which illustrates an isometric view of the seam flange portion 76 of the deployment door 30. For reference purposes the top portion of the door extends from the lower portion of the seam flange 76. As illustrated in FIG. 5 the seam flange 76 and door 30 are shown upside-down. The seam flange 76 includes a plurality of openings 82a–82c which as described below will be utilized to locate the seam flange 76 relative to the housing 44. In addition, the seam flange also includes another plurality of latching openings 84a and 84b which are engaged by latches positioned on a portion of the housing 44.

Reference is again made to FIG. 2 as well as to FIGS. 6 and 7. FIG. 6 illustrates an isometric view of the housing 44 and FIG. 7 is an end view of the housing 44. As can be seen the housing 44 comprises a generally U-shaped structure having a first outer wall 100 and a second outer wall 102 joined by bottom 104. Welded inside the first wall 100 is a flexible inner wall or liner 106. The liner 106 is slightly less wide than wall 100 so that it is free to move relative to ends 108 and 110 of the housing as the cover 30 (which is slightly wider than the initial spacing between the walls 100 and 106 is inserted therebetween. The inner wall 106 includes a plurality tabs 112 (extending toward wall 100). These tabs can be formed in any number of known ways. In this construction an oval portion 111 of the wall 106 is removed and the wall, just above the removed portion, is stamped outwardly forming each tab. As can be appreciated each tab 112 snaps onto a corresponding one of the openings 70a–c as the hinge flange is lowered into the space 150 between the inner and outer walls to retain the hinge portion to the housing 44. As can be seen from the various figures, the wall 106 is formed with an axially extending boss or groove 116 which increases the structural integrity of the housing. Similar bosses or grooves can be located on wall 102 and may be provided in wall 100 if needed.

In the preferred embodiment the first wall 100 includes a plurality of bendable, opposing sets of tabs 152a,b. These tabs can be formed by removing a generally U-shaped section of wall material 154 and are generally positioned opposite the tabs 112 formed in the inner wall 106. Even though the wall 106 includes three tabs 112 the outer wall 100 only includes two sets of tabs 152a,b although a third set of tabs can readily be included opposite the center tab in the inner wall 106. As will be seen from the discussion below, after the hinge flange 60 is inserted into the space between the walls 100 and 106 the tabs 152a,b are bent inwardly forming a friction coupling locking the door 30 in place.

With regard to wall 102 of the housing 44, it can be seen especially from FIGS. 6–8, that the wall 102 includes a plurality of extending cover locating tabs 120a–c. The spacing of these tabs 120a–c corresponds to the spacing of the locating openings or slots 82a–c formed in the seam flange 76. Also formed on wall 102 are two interlocking elements 122a and 122b positioned at opposite ends of the wall 106. Each interlocking element 122a,b comprises a locking tang 124a,b. One such locking tang 124b is shown more clearly in FIG. 8.

The above-described components are assembled as follows: The air bag 56 is secured to the manifold 50 forming a subassembly. The subassembly is secured to the housing 44 such as by inserting the threaded bolts 54 through corresponding openings 56 (see FIG. 6) in the housing 44. A fastener such as nut 130 is used to secure the bolts and the retaining member 50 to the housing 44 (see FIG. 2). The gas generator 52 is later inserted into the housing 44 and into the retaining member 50 through the open end 132 formed in the housing 44.

With regard to the housing 44, it can be seen that the housing is basically fabricated of a single sheet of metal bent to the shape as illustrated in FIG. 6 with the various ends 108 and 110 formed by bent-over flanges 138a,b and 140a,b which are secured together such as by welding. The deployment door or cover 30 is secured to the housing 44 in the following manner. The seam flange 76 of the door 30 is correctly located relative to the housing 44 by inserting the locating tabs 120a–c into the corresponding openings 82a–c. The hinge flange 60 is then positioned at the top of the space 150 between the outer wall 100 and the flexible liner or inner wall 106. Thereafter, the hinge flange 60 is urged downwardly into the space 150 whereupon the tabs 112 engage with the upper surface of the openings 70a–c provided in the hinge flange 60. Thereafter the tabs 152a,b are forcibly bent against the hinge flange 60 deforming (see FIG. 9) the softer hinge flange material, trapping the hinge flange 60 in place. As can be seen from the above, the seam flange 76 has now been properly located relative to the housing 44 by the locating tabs 120a–c and the hinge flange 60 has been lockingly engaged to the housing via the snap coupling between the tabs 112 and openings 70a–c and the friction fit with the tabs 152a,b. All that needs to be done is to now lockingly engage the seam flange 76 to the housing. This is done by pressing the seam flange 76 inwardly such that openings 84a,b pass over the locking units 122a and 122b. Thereafter the seam flange 76 is pressed against the wall 102 permitting the seam flange 76 to over-travel relative to the tangs 124a and 124b whereupon the tangs 124a and 124b lock the seam flange 76 in place. Reference is briefly made to FIG. 8 which shows the seam flange 76 in its locked orientation relative to the tang 124b. Also visible in FIG. 8 is one of the locating tabs 120c extending through the seam flange 76.

Reference is briefly made to FIG. 10 which illustrates an alternate configuration of the tabs 152a,b. As can be seen the tabs have been rotated 90 degrees from their orientation of FIG. 6. As before, after the hinge flange is seated in the housing, the tabs 152a,b are bent inwardly against the exterior of the hinge flange trapping it between the tabs 152a,b and the inner wall 106. FIG. 11 illustrates a further embodiment of the tabs. In this embodiment the tabs are not pre-formed as in the earlier embodiments. In this embodiment the hinge flange 60 is first inserted within the space and fitted against the tabs 112 and the wall 100 is stacked or punched forming upraised, inwardly extending portions 114 which perform the same function as the tabs 152a,b.

Many changes and modifications in the above described embodiment of the invention can, of course, be carried out without departing from the scope thereof. Accordingly, that scope is intended to be limited only by the scope of the appended claims.

I claim:

1. An assembly for an air bag (56) comprising:
   a housing (44) including a first wall (100), an opposite second wall (102), and a flexible third wall (106) secured to the first wall (100) defining a space (150) therebetween, the third wall (106) including a plurality of first tabs (112) extending into the space (150), the first wall having formed thereon at least one locking tab (152a,b) thereon for frictionally locking a portion of a cover (30) in place after the cover has been located between the first and third walls;
   the cover (30) which encloses the housing, includes a hinge portion (40) received in the space (150), engageable with the first tabs (112) to provide a snap connection therebetween and deformable to receive the at least one locking tab and a seam portion (42) including first means (76, 82a–c), engageable with the second wall, and a tear seam (80), for tearing apart in response to deployment forces generated by an inflating air bag.

2. The assembly as defined in claim 1 wherein the at least one locking tab includes at least one set of two opposing bendable tabs (152a,b) formed by removing an adjacent portion of the first wall.

3. The assembly as defined in claim 2 wherein the bendable tabs are bent about corresponding vertical axes in the first wall.

4. The assembly as defined in claim 2 wherein the bendable tabs are bent about corresponding horizontal axes in the first wall.

5. The assembly as defined in claim 1 wherein the at least one locking tab is formed by deforming a portion of the first wall into the cover.

6. An assembly for an air bag (56) comprising:

a housing (44) including a first wall (100), an opposite second wall (102), and a flexible third wall (106) secured to the first wall (100) defining a space (150) therebetween, one of the first wall (100) and the third wall (106) including a plurality of first tabs (112), the first wall having formed at least one locking tab (152a, b) thereon for frictionally locking a portion of a cover (30) in place after the cover has been located between the first and third walls;

the cover (30) which encloses the housing, includes a hinge portion (40) received in the space (150), engageable with the first tabs (112) to provide a snap connection therebetween and deformable to receive the at least one locking tab and a seam portion (42) including first means (76, 82a–c), engageable with the second wall, and a tear seam (80), for tearing apart in response to deployment forces generated by an inflating air bag.

7. The assembly as defined in claim 6 wherein the at least one locking tab includes at least one set of two opposing bendable tabs (152a,b).

8. The assembly as defined in claim 7 wherein the bendable tabs are bent about corresponding vertical axes in the first wall.

9. The assembly as defined in claim 7 wherein the bendable tabs are bent about corresponding horizontal axes in the first wall.

10. The assembly as defined in claim 6 wherein the at least one locking tab is formed by deforming a portion of the first wall into the cover.

11. An assembly for an air bag (56) comprising:

a housing (44) including a first wall (100), an opposite second wall (102), and a flexible third wall (106) secured to the first wall (100) defining a space (150) therebetween, one of the first wall (100) and the third wall (106) including a plurality of first holding members (112), the first wall having formed thereon at least one locking tab (152a,b) for frictionally locking a portion of a cover (30) in place after the cover has been located between the first and third walls;

the cover (30) which encloses the housing, includes a hinge portion (40) received in the space (150), engageable with the first holding members (112), the hinge portion being deformable to receive the at least one locking tab, the cover further including a seam portion (42) including first means (76, 82a–c), engageable with the second wall, and a tear seam (80), for tearing apart in response to deployment forces generated by an inflating air bag.

* * * * *